United States Patent
Maestrelli

[15] 3,695,447
[45] Oct. 3, 1972

[54] SELF-CLEANING FILTER, PARTICULARLY FOR DRY-CLEANING PLANTS

[72] Inventor: Gino Maestrelli, 55, via Bernardo Quaranta, Milan, Italy

[22] Filed: Oct. 13, 1970

[21] Appl. No.: 80,410

[30] Foreign Application Priority Data

Dec. 15, 1969 Italy ................25801-A/69

[52] U.S. Cl. ..............................210/332, 210/407
[51] Int. Cl. ...........................................B01d 29/38
[58] Field of Search......210/332, 334, 409, 407, 408, 210/298

[56] References Cited

UNITED STATES PATENTS

| | | |
|---|---|---|
| 3,491,887 | 1/1970 | Maestrelli..............210/332 X |
| 3,029,951 | 4/1962 | Cannon.................210/408 X |
| 2,022,016 | 11/1935 | Wardle.....................210/332 |

*Primary Examiner*—Frank A. Spear, Jr.
*Attorney*—Wenderoth, Lind & Ponack

[57] ABSTRACT

A self-cleaning filter, particularly for dry-cleaning plants, comprising a liquid filled chamber wherein a plurality of filtering elements are radially housed in a circularly arranged pattern around a central free chamber zone. At least one centrifugal impeller is fitted within said free zone and suitably driven at time intervals by a motor shaft in order to cause the liquid be moved against and through said filtering elements for the cleaning purpose thereof.

9 Claims, 7 Drawing Figures

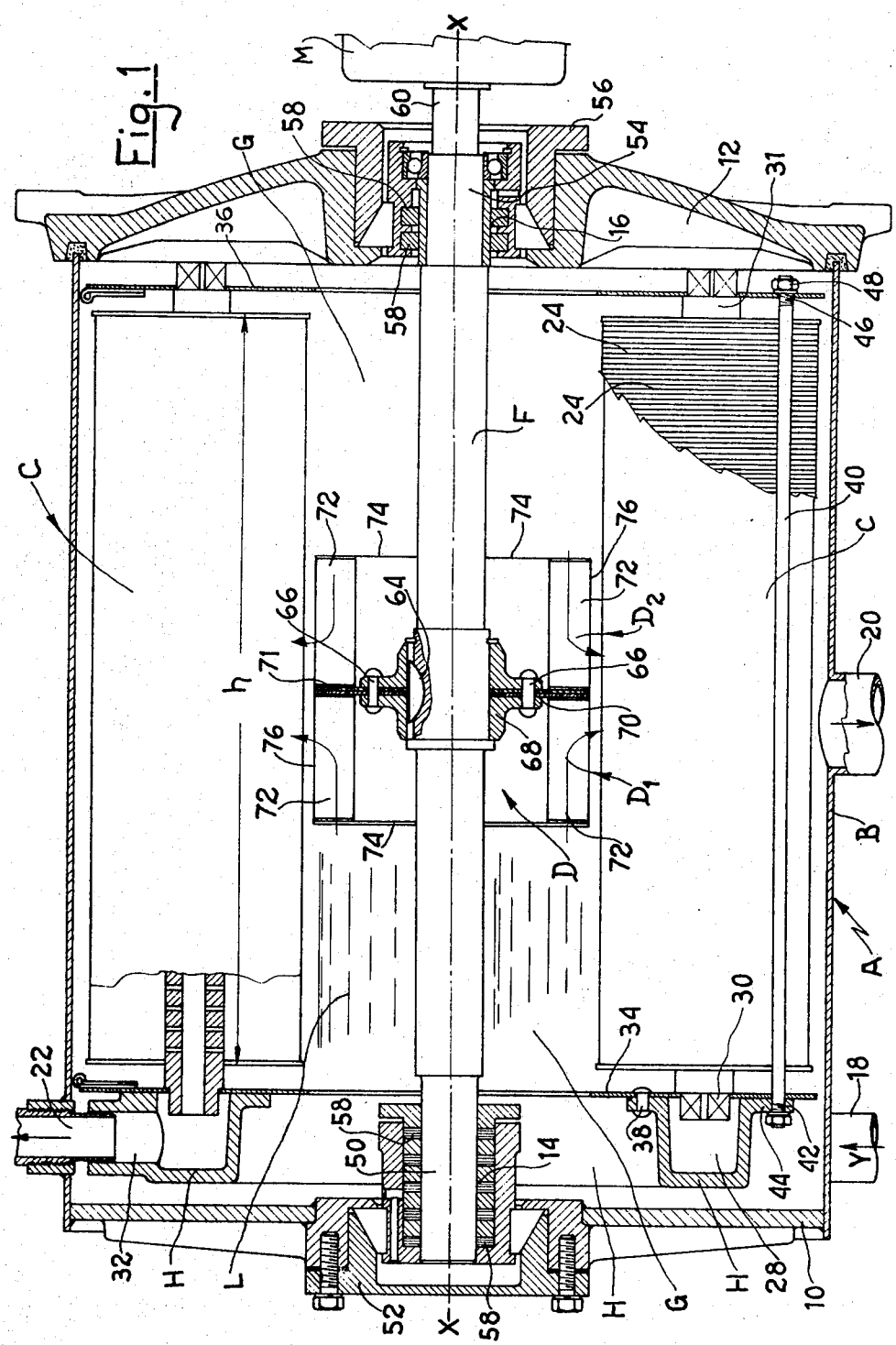

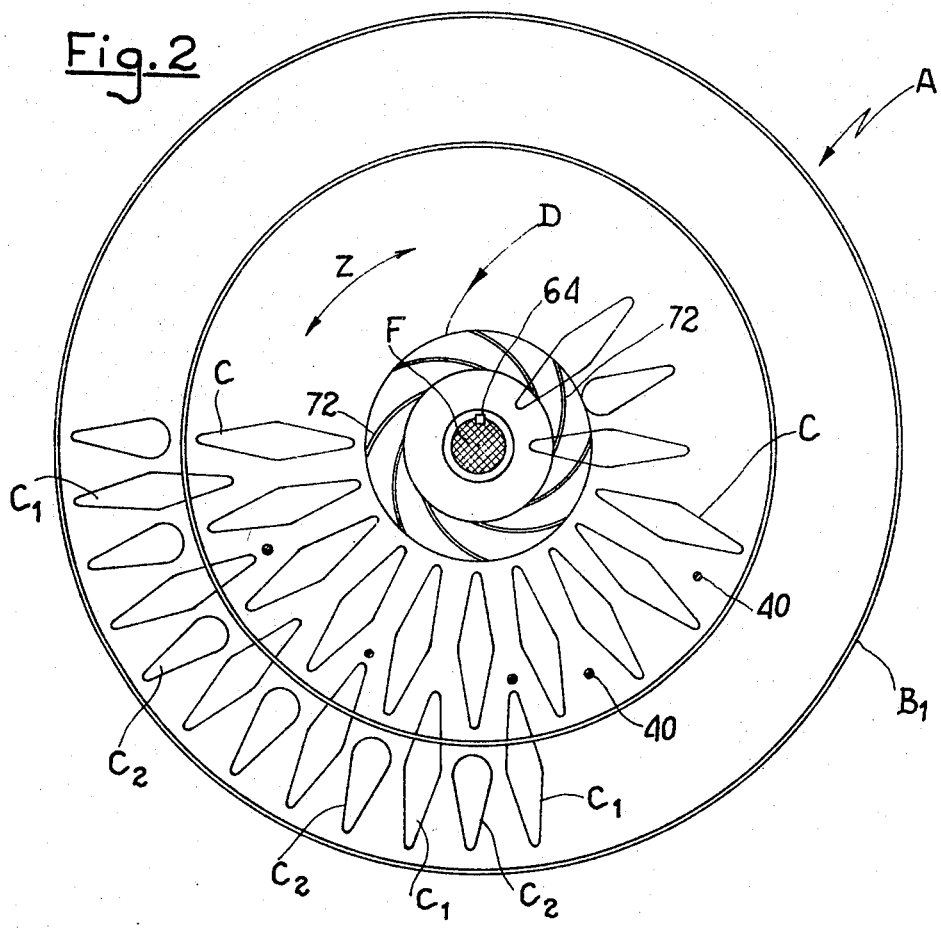
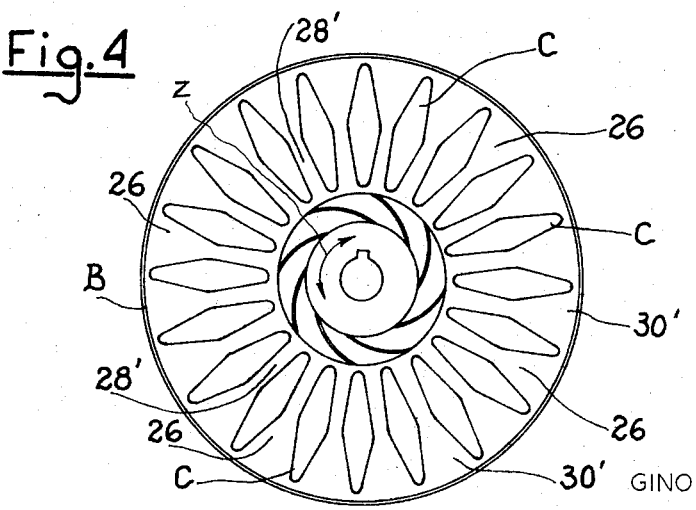

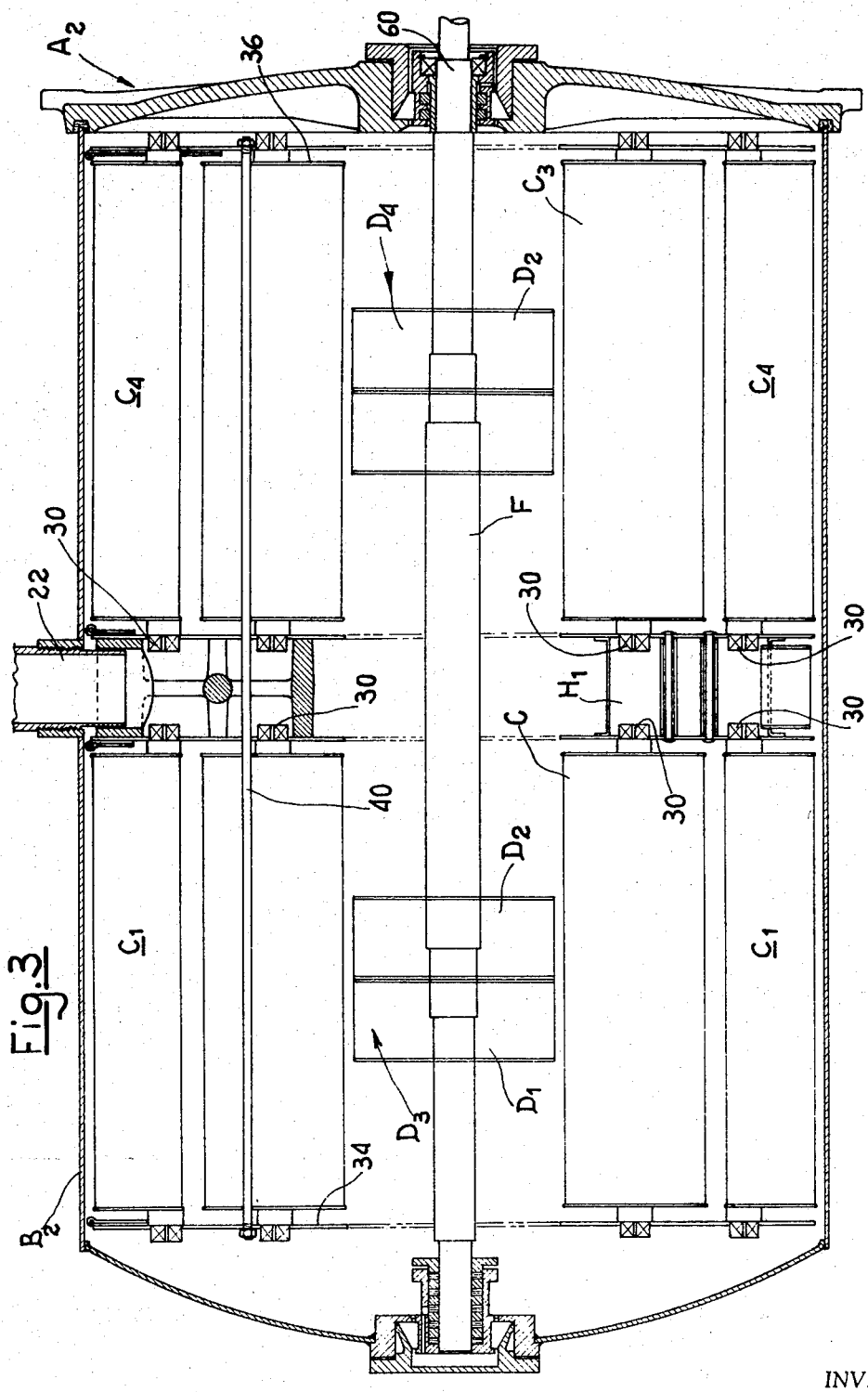

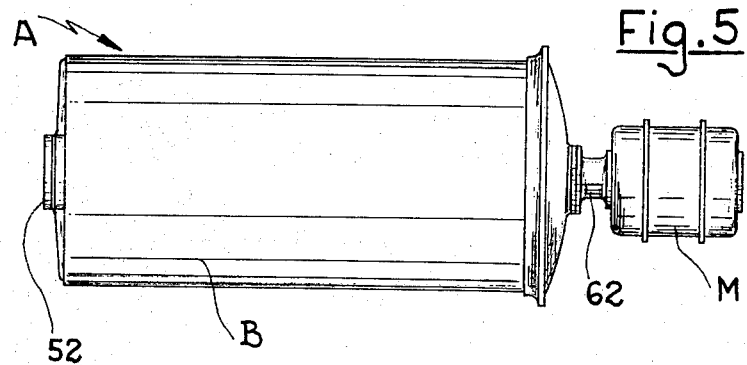
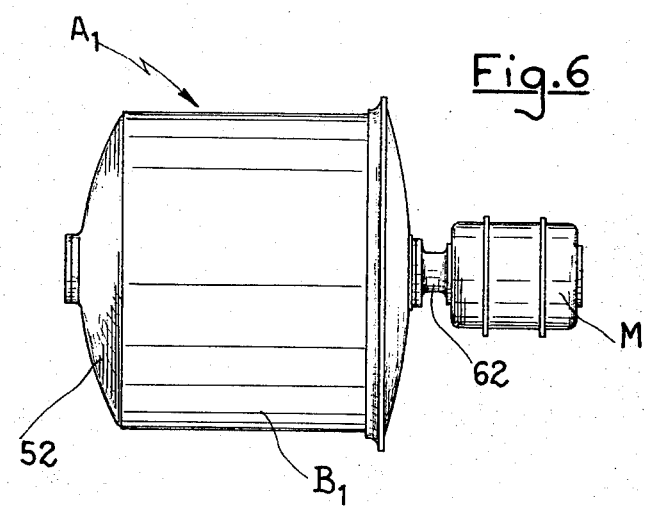
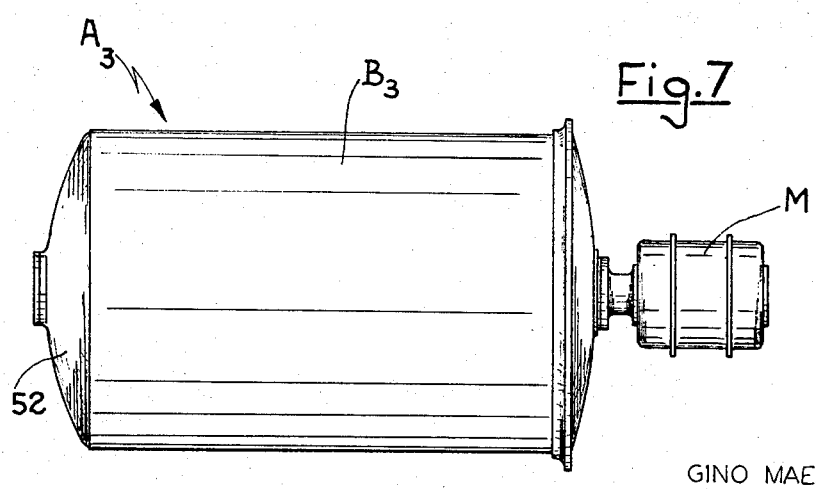
INVENTOR
GINO MAESTRELLI

SELF-CLEANING FILTER, PARTICULARLY FOR DRY-CLEANING PLANTS

BACKGROUND

This invention concerns a self-cleaning filter, particularly for dry-cleaning plants.

Many difficulties were heretofore involved with the cleaning operation of filters for the solvent (usually consisting of trichloroethylene or liquid perchlorate) in dry-cleaning plants. Such difficulties depend on the filter structure and the nature of usually utilized filtering powders, as well as on the cleaning plant operation and the operating times thereof.

The above specified problem was already efficiently solved, as disclosed in U.S. Pat. Nos. 3,438,497 and 3,491,887 granted to same Applicant, by means of a turbulent motion imparted to the liquid filling the filter casing when the filtering elements are to be cleaned, said turbulent motion being caused by the same filtering elements which, under a suitable control, act as impeller blades and create said solvent turbulent motion. The solvent therefore acts as a filtering element cleaning means in this plant operational step.

A further solution of said filter self-cleaning problem is provided by this invention, wherein the solvent or other liquid flowing through the filter is again utilized for cleaning the filtering elements.

Like all other self-cleaning filters, previously patented by same Applicant, the filter according to this invention can be utilized not only in dry-cleaning plants, but in all other plants wherein liquids are to be filtered and purified, as, e.g., wine or oil clarifying plants, chemical factories, liquid purifying plants, water cleaning plants for swimming pools and so on.

SUMMARY

The improved filter according to this invention of the type comprising a casing wherein the filtering elements are fitted and to which a dirty liquid duct and a purified liquid discharge duct are connected, and a pipe fitting for draining the sludges and sediments removed from the filtering elements, is characterized in that it comprises a plurality of filtering elements, fastened preferably in a radially shaped pattern around the center of the filter casing in such a manner as to leave free at least a part of the central portion thereof, and a centrifugal impeller fitted within said part and keyed on a shaft lying in said central portion of the filter casing and suitably driven at time intervals by a motor, said driven impeller rotation imparting a centripetal-centrifugal motion to the liquid within said casing which is sucked and forced by said impeller through the filtering elements in order to sweep and wash their surfaces and thereby to clear the same from all impurities, occlusions, sludges and the like. At the end of said cleaning operation, all filtering element surfaces are brought back to their initial condition of full efficiency.

The previously basic inventive idea may be carried out in many different embodiments with reference to the filter design, the use thereof for liquids of different types and grades, the nature of means adapted to cause said filter to perform the required operation and the mutual arrangement of the means. The embodiments are covered by the invention when utilizing the same basic inventive idea, i.e., when at least one centrifugal impeller imparts a suitable motion to the liquid in such a manner as to have the same forced through the stationary filtering elements which may be considered as turbine guide blades (obviously in an opposite direction), thus removing all impurities and dirt from said elements.

According to a first embodiment of this invention, a plurality of filtering elements, each having an elongated and slender shape with a preferably lozenge-shaped cross-section, are stationarily fitted in a radial arrangement around the center of the filter casing or chamber and toward the inner wall thereof, a space being left, between each filtering element and the adjacent one, which extends all along said elements. The middle part of the filter chamber central zone, free from said plurality of filtering elements, houses a centrifugal impeller, keyed on a shaft extending along the longitudinal axis of the chamber and having one end sealingly supported by a bearing means, while its opposite end sealingly extends out of a chamber flange in order to be connected with a motor shaft by which said impeller is driven to thereby obtain said liquid motion within the filter chamber.

The impeller advantageously consists of two rigidly fastened, adjacent but axially spaced halves whereby when a drive is imparted in a required direction thereto, said liquid motion is obtained on two subdivided liquid portions, each portion being axially sucked and radially forced by a related impeller half to perform the above stated action.

When required and particularly in high-capacity plants, the total filtering surface can be increased by the addition of further pluralities of filtering elements to the above considered one. Thus, e.g., an additional row of filtering elements can be fitted outside the first row in a filter chamber having an increased diameter, the filtering elements of both rows being advantageously offset with each other, or said additional filtering element row or rows can be axially fitted side by side with reference to the considered one in a filter chamber having an increased height, or finally rows of filtering elements may be fitted side by side both in axially and radially extending directions.

When rows of filtering elements are fitted side by side in axial direction, a separate impeller is advantageously provided for each row, said impellers being suitably spaced all along the driving shaft.

The design of the above described improved filter, particularly with reference to the components thereof according to this invention, is such as to allow a very easy assembling and operation of the same.

In fact, the filter construction comprises at least one annular manifold to which the tubular ends of single filtering elements are connected, the opposite closed ends of said filtering elements being clamped in a stiffening plate. Said manifold may be tightly connected with said plate by means of suitable tie rods, in order to firmly lock said filtering elements therebetween and thus obtain an assembly which can be inserted into a filter chamber and fastened therein by suitable means, e.g., a key, a pin or the like. The filter component comprising the driving shaft and the impeller or impellers is axially fitted in the central zone of the filter chamber.

The hydraulic circuit, i.e., the path followed by the liquid when the filter is normally operating, extends from a chamber inlet nipple in such a way as to cause the liquid to pass across all filtering surfaces that are formed by spirally wound wires adapted to retain a filtering powder (e.g., "Decalith," kieselguhr or the like), as well known, in order to leave therein all its impurities. The liquid then flows inside the filtering elements and through the tubular ends thereof into said manifold, reaching an outlet nipple, wherefrom the purified liquid flows to a processing plant and in a drycleaning plant to a circuit leading to a rotary basket wherein garments to be cleaned are contained.

DRAWINGS

FIG. 1 is a partly sectioned axial view of a first embodiment of an improved filter according to this invention, designed for filtering the solvent in dry-cleaning plants.

FIG. 2 is a cross-section of a filter similar to that of FIG. 1, comprising two more filtering element rows radially arranged side by side in addition to a first one, within a filter casing having a greater diameter.

FIG. 3 is a view similar to that of FIG. 1, referring to a third improved filter embodiment wherein filtering element rows radially arranged side by side and filtering element rows axially arranged side by side are provided.

FIG. 4 is a cross-sectional view of FIG. 1 on a smaller scale.

FIG. 5 is a side view of a filter comprising two filtering element rows axially fitted side by side along with the related motor by which the impeller shaft is driven.

FIG. 6 is a side view of the filter shown in FIG. 2, and

FIG. 7 is a side view of a filter $A_3 - B_3$ similar to that of FIG. 6, but comprising two filtering element rows similar to that of FIG. 2 and axially fitted side by side.

PREFERRED EMBODIMENT

Referring now to FIGS. 1 and 4 of the drawings, an improved filter A (namely a filter for the solvent utilized in a dry-cleaning plant) consists of a cylindric casing B closed at both ends by flanges 10 and 12, one of which is welded to said cylindric body and the other is tightly fastened thereto by any suitable means in order to define a filtering chamber. The chamber B houses a plurality of filtering elements C peripherally secured to an inner wall thereof, as well as an impeller D, centrally keyed on an axially extending shaft F that is supported by bearings 14 and 16. When said shaft F along with the impeller D is driven, a suitable motion is imparted to the liquid solvent in order to automatically clean the filtering surfaces, as previously stated and as will be disclosed more detailedly later on.

Connected with the chamber B are: an inlet duct 18 through which the solvent to be purified is fed, as well as a duct 20 through which the sludge, impurities and dirt collected in the chamber after a given number of cleaning operations are drained; on the opposite side an outlet duct 22 for the filtered or purified solvent in provided, said solvent being brought back to a chamber wherein a revolving drum, filled with garments to be cleaned, is fitted.

As specified and shown in the above stated applicant's U.S. patents, the filtering elements C consist each of an elongated body, having a lozenge-shaped cross-section and comprising a rib whereon a wire 24 is wound. The winding turns are spaced from each other by a small distance in order to retain a filtering powder filling the whole winding of each element C and the interstices between said turns in order to ensure the required filtering action.

The inner peripheral portion of said chamber B is taken-up by the above elements C leaving free a center zone G wherein the impellers $D_1$ and $D_2$ are fitted.

As shown in FIG. 4, the arrangement of stationary filtering elements C is such as to form a row-shaped assembly about the filter longitudinal axis, each element C lying on a radius of the filter cross-section. Between each element C and the adjacent ones is left a space 26 extending all along the overall element height $h$. Said space has a cross-section, considered from the center of each element toward the outer edges thereof, showing firstly a substantially uniform portion 28' followed by an outwardly flaring portion 30'.

The winding 24 of each element C defines a recess closed at its right end, as shown in FIG. 1, while the left end thereof is connected with a cavity 28 of an annular manifold H through an orifice that extends axially across a block 30 secured to the above stated end of said element C.

The manifold H, preferably obtained by a casting process, comprises a channel forming said cavity 28, to which a nipple 32 for the filtered solvent outlet duct 22 is radially fitted.

The assembly of manifold H and filtering elements C comprises an annular base plate 34 and an annular top plate 36, said annular base plate being secured to the manifold H as at 38 in order to firmly and sealingly clamp said manifold and filtering elements by means of axially extending tie-rods 40. Ten or more tie-rods 40 can be utilized with the ends 42 thereof extending through holes formed all around the manifold rim 44, while the tie-rod ends 46 extend through holes on the top plate 36. Then, by screwing nuts 48 on the tie-rod threaded ends, the top plate 36 is forced towards the base plate 34, thereby clamping the elements C both with each other and in respect of manifold H, as previously stated. Obviously, said blocks 30 extending from the elements C act on related points of base plate 34, as well as said block 31 act on related points of top plate 36.

Once the assembly C–H is performed, it is inserted into the chamber B and firmly secured therein through engagement of the end of pipe 22 within the nipple 32. A further securing of said assembly and an accurate centering thereof in respect of longitudinal axis X—X may be performed by pins keys or the like.

As previously stated, the driving shaft F is co-axially fitted with reference to the axis X—X, one shaft end 50 being supported by said bearing 14 that is centrally secured to the flange 10 by a shell 52, while the opposite shaft end 54 is supported by said bearing 16 also fastened by a shell 56 to said flange 12. Said shaft end 54 sealingly extends outwardly from said flange 12, suitable packing glands 58 being provided on said shaft ends 50, 54. Said shaft end 54 comprises a tapered outer portion 60 which is connected with a coupling 62 keyed on the driven shaft end of an electric motor M, by which said shaft F and thus the impeller D are driven at time intervals.

Said impeller D is centrally located within said space G that is left free by the filtering elements C, and is rigidly fastened to said shaft F by a key 64. Said impeller consists of two symmetrically positioned halves $D_1 - D_2$ arranged in axially, opposite relationship and rigidly connected together by rivets 66.

Each half-impeller is formed with a hub 68, wherefrom a circular wall 70 extends perpendicularly to axis X—X and is fitted with a plurality of spiral-shaped blades 72 extending therefrom. The inlet or intake section of blades is indicated by the reference numeral 74, while the outlet or delivery section is indicated by the reference numeral 76, the impeller having therefore an axial intake and a radial delivery.

What is previously stated with reference to half-impeller $D_1$ holds for the half-impeller $D_2$ too. Said two half-impellers are coupled together by circular walls 70,71 in order to form an impeller D fitted with blades on either sides and wherein the walls 70,71 extend along the transversal middleline thereof. Obviously, any other suitable design of the impeller might be selected for the purposes to be attained.

During the filter usual operation, the shaft F and the impeller D are standing still, and the liquid solvent flows through 18, in the direction of arrow Y and into the chamber B, thus filling the same. Then, said solvent percolates through the filtering walls 24 of elements C into the inside thereof, all impurities and dirt being kept back on said walls. The thus cleaned solvent flows then into the manifold channel 28 and through the duct 22, back to the dry-cleaning plant or to the rotary drum thereof.

After a given operational time, the filtering surfaces need to be cleared. For such a purpose, the solvent chamber B is disconnected from the remaining part of the circuit and the motor M is started at a speed, e.g., from 750 to 1,300 RPM in the direction of arrow Z. Thus the impeller D will rotate together with said shaft F and will impart the required motion to solvent L. Said impeller D operates substantially like a sucking and forcing centrifugal pump, since the liquid is axially sucked through the sections 74 of half-impellers $D_1 - D_2$ and is axially delivered through the section 76 thereof. Thus a liquid motion (or fluid-dynamic action) is obtained which can be assumed as carried out in the direction of the arrows in FIG. 1.

The solvent is subdivided in two portions, one of which is acted upon by the half-impeller $D_1$ and the other by the half-impeller $D_2$. The solvent or other liquid is sucked from the spaces 26 between said adjacent elements C, while on the other side it is forced again through the same spaces thereby exerting a continuous and strong action on the filtering surfaces 24, wherefrom all impurities, dirt, sludges and the like are thus positively removed. At the end of said self-cleaning step, or at any rate when the motor is stopped, after about 30 seconds, the filtering surfaces 24 are brought back to their starting cleaned condition, to re-operate in their best possible condition.

After a given number of self-cleaning steps, the sludge collected on the bottom of chamber B is drained therefrom through the pipe 20 along with the solvent, whereafter said chamber is filled again with fresh solvent through the duct 18.

FIG. 2 shows an alternative embodiment of a filter $A_1$, wherein a further row of filtering elements $C_1$ is radially added to said first row of elements C, said elements $C_1$ being shifted in respect of the elements C and secured to the chamber $B_1$, whose diameter is obviously larger than that of chamber B. Moreover, further filtering elements $C_2$ having a different cross-section are fitted between the elements $C_1$ and radially aligned with the filtering elements C. Even in this embodiment the impeller D similar to that of FIG. 1 imparts the required motion to solvent during a cleaning step. The plant filtering ability is thus increased, since the total filtering surface is much larger, owing to the above stated three sets of filtering elements.

FIG. 3 shows a further embodiment of a filter $A_2$ wherein an inner row of filtering elements C and an outer row of filtering elements $C_1$ are radially arranged side by side, said filter comprising further a third row of elements $C_3$ axially placed side by side with respect to row C and a fourth row $C_4$ of elements, likewise axially placed side by side with respect to row $C_1$. Thus, the filter casing $B_2$ has a larger diameter and a greater length in order to proportionally increase the capacity of said filter.

The driving shaft F, having its end 60 engaged with the related motor, carries two impellers $D_3$ and $D_4$ keyed on said shaft, the former one in front of said filtering elements $C - C_1$ and the latter in front of said filtering elements $C_3 - C_4$.

Each impeller $D_3 - D_4$ is similar to that previously described with reference to FIG. 1 and comprises two half-impellers $D_1 - D_2$ operatively acting on the solvent placed in the chamber zone wherein the related filtering elements are fitted.

The embodiment of FIG. 3 comprises a single manifold $H_1$ extending across the middle section of chamber $B_2$, to which the free ends 30 of all filtering elements are connected. An outlet duct 22 for the clarified solvent is also connected to said manifold.

All filtering elements are fastened with each other and with the manifold H between a base plate 34 and a top plate 36 that are connected by tie-rods 40 according to what has been described with reference to FIG. 1.

The operation of filter $A_2$ is similar to that of previously disclosed embodiments and the filtering surfaces are self-cleaned by means of a solvent motion imparted by said impellers in order to clean the filtering elements.

Obviously, the filter operation is the same when the filtering elements, instead of being positioned along a horizontal axis all are located along a vertical or inclined axis.

FIGS. 5, 6 and 7 are side views of filters fitted with two axially arranged rows of filtering elements, with three radially arranged rows of filtering elements and with six rows of axially and radially arranged filtering elements, respectively.

It is to be understood that while specific embodiments of this invention have been herein shown and described, many changes may be made therein without departing from the spirit and scope of the invention, as defined in the appended claims.

I claim:

1. A self-cleaning filter, particularly for filtering a liquid solvent and then cleaning the filtering elements in dry-cleaning plants comprising a stationary chamber having a solvent inlet and an outlet duct connected thereto, a plurality of filtering elements radially mounted in said chamber, a pipe fixed to said chamber for draining the sludges and sediments removed from said filtering elements, said filtering elements being stationarily fastened to and peripherally arranged within said chamber to leave free a part of the central zone thereof, a shaft rotatably mounted in said central zone, means for driving said shaft at time intervals, a centrifugal impeller substantially smaller than said central zone centrally mounted on said shaft to impart a centripetal-centrifugal motion to the solvent within said chamber to respectively suck and force the same through said filtering elements whose surfaces are forcibly cleared by said solvent and freed from all impurities, dirt, occlusions, sludges and the like, and brought back to their cleaned starting condition and a stationary annular manifold to which said outlet duct is connected mounted in said chamber for receiving the filtered solvent from said filtering elements.

2. A filter as set forth in claim 1 wherein said impeller comprises centrifugal vanes secured to each other and to said shaft nearly in the middle plane of the impeller, said vanes defining therebetween spaces which are open towards the side portions whereby upon rotation of said impeller the solvent is centrifugally outwardly forced in the middle portion between said filtering elements, and is caused to circulate first in opposite directions parallel to said shaft and then inwardly in said side portions for finally returning to the impeller where the spaces between the vanes are open.

3. A filter according to claim 1, wherein said impeller comprises two adjacent halves fastened together and axially spaced by circular walls, the rotation of said shaft and said impeller in a required direction resulting in an axial sucking and radial forcing of two solvent portions, each of which is acted upon by the related impeller half.

4. A filter according to claim 3, wherein each half-impeller consists of a circular wall fitted perpendicularly to said shaft and provided with spiral-shaped blades having a radial sucking section and an axial delivery section, said two impeller halves being connected by said circular walls that are secured to said shaft.

5. A filter according to claim 1 wherein a plurality of radially located rows of filtering elements are concentrically fitted with each other and in respect to said shaft a part of the filtering elements of one row being shifted in respect of the filtering elements of the other row.

6. A filter according to claim 1, wherein a plurality of rows of filtering elements are located side by side in an axial direction within said chamber.

7. A filter according to claim 1 wherein a plurality of rows of filtering elements are arranged side by side in both radial and axial directions.

8. A filter according to claim 1, having rows of filtering elements arranged side by side in axial direction, wherein each filtering element row is associated with a related impeller, the impellers being spaced along said shaft.

9. A filter according to claim 1 wherein said annular manifold has the tubular ends of all said filtering elements connected thereto with the opposite ends of said filtering elements closed and fastened to a base plate to clamp said filtering elements between the same and said manifold by means of tie-rods in order to form an assembly which can be inserted into said chamber.

* * * * *